(12) United States Patent
Nishimura

(10) Patent No.: US 7,633,862 B2
(45) Date of Patent: Dec. 15, 2009

(54) FLOW CONTROL METHOD AND APPARATUS THEREOF

(75) Inventor: Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 584 days.

(21) Appl. No.: 11/158,138

(22) Filed: Jun. 21, 2005

(65) Prior Publication Data

US 2005/0232150 A1  Oct. 20, 2005

Related U.S. Application Data

(63) Continuation of application No. PCT/JP03/07033, filed on Jun. 3, 2003.

(51) Int. Cl.
*G01R 31/08* (2006.01)
(52) U.S. Cl. ...................................... 370/230
(58) Field of Classification Search ......... 370/229–240, 370/252; 709/231–237
See application file for complete search history.

(56) References Cited

U.S. PATENT DOCUMENTS

| | | | |
|---|---|---|---|
| 5,559,796 A * | 9/1996 | Edem et al. | 370/412 |
| 6,021,132 A * | 2/2000 | Muller et al. | 370/412 |
| 6,985,438 B1 * | 1/2006 | Tschudin | 370/230 |
| 2001/0014104 A1 | 8/2001 | Bottorff et al. | |
| 2002/0159480 A1 | 10/2002 | Sekihata et al. | |
| 2003/0051045 A1 * | 3/2003 | Connor | 709/236 |
| 2003/0174649 A1 * | 9/2003 | Shankar et al. | 370/235 |
| 2003/0223361 A1 * | 12/2003 | Hussain et al. | 370/230 |
| 2004/0062200 A1 * | 4/2004 | Kesavan | 370/235 |

FOREIGN PATENT DOCUMENTS

| | | |
|---|---|---|
| JP | 2001-197110 | 7/2001 |
| JP | 2001-274824 | 10/2001 |
| JP | 2002-325093 | 11/2002 |

OTHER PUBLICATIONS

Japanese Office Action mailed Jul. 10, 2007, from the corresponding Japanese Application.
Toshihide Yagashira "Practical Point of QoS Installation for Utilizing Ethernet Service" N+I Network Guide, Softbank Publishing Corporation, Sep. 1, 2002, vol. 17, No. 9, p. 108-115.
International Search Report dated Sep. 16, 2003.

* cited by examiner

*Primary Examiner*—Kwang B Yao
*Assistant Examiner*—Tung Q Tran
(74) *Attorney, Agent, or Firm*—Fujitsu Patent Center

(57) ABSTRACT

In a flow control method for conducting a flow control in a network in that a variable-length frame is transmitted and a minimum inter frame gap being a fixed length is regulated among frames, by setting each variable-length frame to be a subject of the flow control by adding a value corresponding to a fixed-length portion outside a frame region to a frame length of the each variable-length, it is possible to conduct the flow control precisely and easily, independent of the frame length in the variable-length frame network, and it is possible to improve flexibility of a location where to conduct the flow control.

4 Claims, 17 Drawing Sheets

FLOW CONTROL METHOD AND APPARATUS THEREOF

CROSS-REFERENCE TO RELATED APPLICATIONS

This application is a U.S. continuation application filed under 35 USC 111(a) claiming benefit under 35 USC 120 and 365(c) of PCT application JP03/07033, filed Jun. 3, 2003. The foregoing applications are hereby incorporated herein by reference.

BACKGROUND OF THE INVENTION

1. Field of the Invention

The present invention generally relates to flow control methods and apparatuses thereof, and more particularly to a flow control method of a network transmitting a variable-size frame and an apparatus thereof.

2. Description of the Related Art

At an input/output of a network such as a carrier network, it is common to arrange an apparatus having a flow control mechanism such as a policer (Policer) for restricting traffic being sent from a user to a network, a shaper (Shaper) for adjusting data to send from the network to the user, and a like.

As a policing method for a frame, RFC2697 "A Single Rate Three Color Marker", RFC2698 "A Two Rate Three Color Marker", and a like are offered.

In any case, as shown in FIG. 1, dual token buckets P and C are provided, a rate of flow of a frame passing through the dual token buckets P and C are measured, and a marking is conducted to the frame with any one of green, yellow, and red. In addition, there are two modes: a color blind (Color-Blind) mode which ignores an added color by the marking conducted until a previous stage, and a color aware (Color-Aware) mode which considers the added color.

In RFC2698, two rates are set, and the marking is conducted by using each of the two rates and a burst allowed value as parameters. As one example, an operation of the policer in the color blind mode of RFC2698 will be described. First, parameters in RFC2698 are a PIR (Peak Information Rate: peak rate), a PBS (Peak Burst Size: burst volume allowed for the PIR, a CIR (Committed Information Rate: rate that guarantees a low discard), and a CBS (Committed Burst Size: burst volume allowed for the CIR).

As shown in FIG. 1, the policer includes the two token buckets P and C. If the two token buckets P and C are not filled up, Tp is incremented by one byte per a 1/PIR time, and Tc is incremented by one byte per a 1/CIR time.

It is assumed that a frame having B bytes in length arrives at a certain time t. At this time, as shown in FIG. 2, if $Tp(t)-B<0$, the frame is marked with red.

Moreover, as shown in FIG. 3, if $Tp(t)-B \geq 0$ and $Tc(t)-B<0$, the frame is marked with yellow and Tp is decremented by only B bytes.

Furthermore, as shown in FIG. 4, if $Tp(t)-B \geq 0$ and $Tc(t)-B \geq 0$, the frame is marked with green, and both Tp and Tc are decremented by only B bytes.

When each of frames marked as above described is queued into a buffer, a priority is defined to discard the frames. For example, in this buffer, a first threshold is defined for a red frame, a second threshold is defined for a yellow frame, and a third threshold is defined for a green frame. Red input frames are not buffered and are discarded when a queue length in the buffer exceeds the first threshold, the red input frames and yellow input frames are discarded when the queue length in the buffer exceeds the second threshold, all red, yellow, and green input frames are discarded when the queue length of the buffer exceeds the third threshold.

In addition, for example, there is an invention described in a patent reference 1 as an invention that is a method for interfacing to an adjacent high speed data communication network and compresses by eliminating a gap among packets.

Patent Reference 1

Japanese Laid-open Patent Application No. 2001-274824

As described above, in general, the policer and the shaper determine a policing and a shaping based on a length of the frame. For example, in a case of a LAN (including a WAN and a MAN in portions describing the LAN in the specification of the present application) such as Ethernet™, a frame length means a length from an destination address (Destination Address) to FCS (Frame Check Sequence).

However, in the LAN, a preamble being 8 bytes is additionally provided at a head of a frame. In addition, a minimum IFG (Inter Frame Gap: gap between frames) is always inserted among the frames. Since a LAN frame is a variable length, a ratio of overhead portions to a physical line rate varies depending on a length of a frame body.

For example, a case of sending data at a full wire rate via a 10Base-T is considered. In this case, if a frame is the shortest frame being 64 bytes entirely, as shown in FIG. 5(A), a transmission rate (frame rate) at a frame level is shown as 10 Mb/s×64 bytes/(64+8+12 bytes)≈7.62 Mb/s.

On the other hand, if the frame is the longest frame being 1518 bytes entirely, as shown in FIG. 5(B), the frame rate is shown as 10 Mb/s×1518 bytes/(1518+8+12 bytes)≈9.87 Mb/s.

As described above, since the frame rate varies depending on the frame length even if the frame is sent at the same physical line speed, when the policing or the shaping is conducted as conventionally conducted, it is difficult to conduct a precise flow control and also an operation and a network design becomes complicated.

In practice, in a case in that 10 Mb/s at the LAN level is made in an agreement, when a policing rate at the policer is set to be 7.62 Mb/s and all packets sent from a user are frames being 1518 bytes, a transmission rate becomes 7.7 Mb/s at the physical line speed even in that each of the frames includes the preamble and the minimum IFG. Hence, a bandwidth settled in the agreement with the user cannot be guaranteed.

However, on the other hand, when the policing rate at the policer is set to be 9.87 Mb/s and all packets sent from the user are frames being 64 bytes, an actual bandwidth in that the preamble and the minimum IFG are additionally provided to the frame is increased up to 12.95 Mb/s. That is, it is required to assume such a case in the network and to always assure the bandwidth sufficiently. As a result, storage efficiency is degraded.

On the other hand, in a carrier network and a like, as shown in FIG. 6, there is a case of adding information which is internally recognized in the network such as a user identification tag used to identify a user, to a frame. In such this network, if there are network apparatuses 11, 12, and 13 additionally providing the user identification tag and a network apparatus 14 conducting the policing as shown in FIG. 7, the user identification tag additionally provided at the carrier network 10 also becomes a subject for the policing. Even if the user keeps the agreement of the rate, a frame may be discarded.

Accordingly, in order to prevent from a frame discard caused by this tag addition, it is required to set a rate of the policing or the shaping to be higher. However, similar to the previously described preamble and minimum IFG, a proportion of the tags is varied depending on the frame length.

For example, in a case of a tag being 4 bytes, if all frames are 64 bytes, as shown in FIG. 8(A), the bandwidth is increased by 6.25%. If all frames are 1518 bytes, as shown in FIG. 8(B), the bandwidth is increased by only approximately 0.26%. As a result, if the bandwidth is increased by only 0.26%, the bandwidth may becomes narrower than the settled bandwidth. On the other hand, if the bandwidth is increased by 6.25%, it is required to assure a bandwidth being more than the settled bandwidth. As a result, a storage design is degraded.

The above-described problems are caused since fixed-length portions are mixed in the frame in a variable-length frame network. That is, a fixed-length portion such as a portion of the preamble and the minimum IFG (20 bytes), and an identification tag (n bytes) exists by one to one for each frame. However, since the frame is the variable length, the proportion of these fixed-length portions changes for each frame. As a result, it becomes impossible to precisely conduct the flow control, and the network design becomes complicated.

DISCLOSURE OF THE INVENTION

Accordingly, it is a general object of the present invention to provide a flow control method and an apparatus thereof, in which a flow control can be precisely and easily conducted independent of a frame length in a variable-length frame network and a flexibility of a location where to conduct the flow control can be greatly improved.

In order to achieve this object, the present invention can be configured so that in a flow control method for conducting a flow control in a network in that a variable-length frame is transmitted and a minimum inter frame gap being a fixed length is regulated among frames, said flow control method comprising the step of: setting each variable-length frame to be a subject of the flow control by adding a value corresponding to a fixed-length portion outside a frame region to a frame length of the each variable-length.

According to such a flow control method, it is possible to conduct the flow control precisely and easily, independent of the frame length in the variable-length frame network, and it is possible to improve the flexibility of the location where the flow control is conducted.

DESCRIPTION OF THE PREFERRED EMBODIMENT

In the following, embodiments of the present invention will be described with reference to the accompanying drawings.

Figure 1:
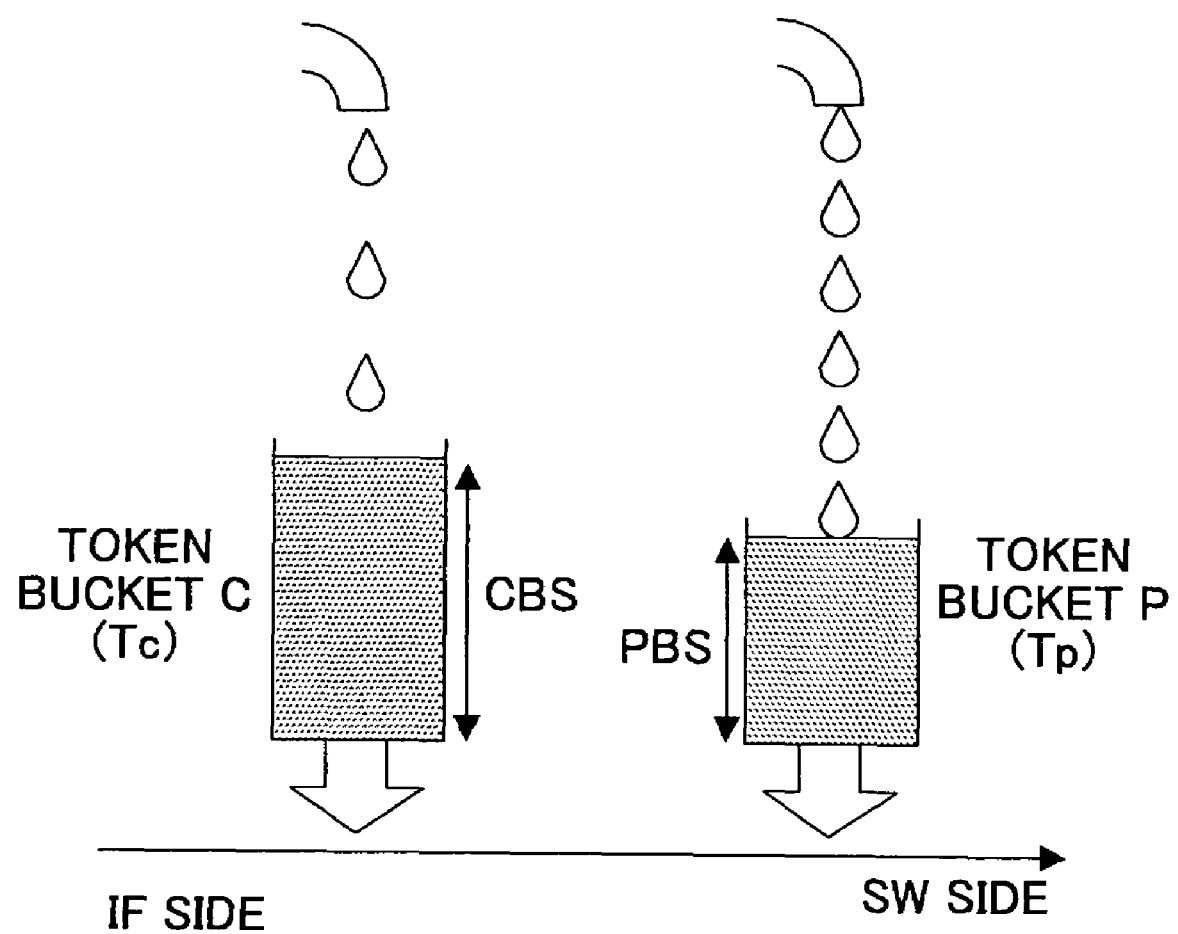
FIG. 1 is a diagram for explaining a policing with respect to a frame.
Figure 2:
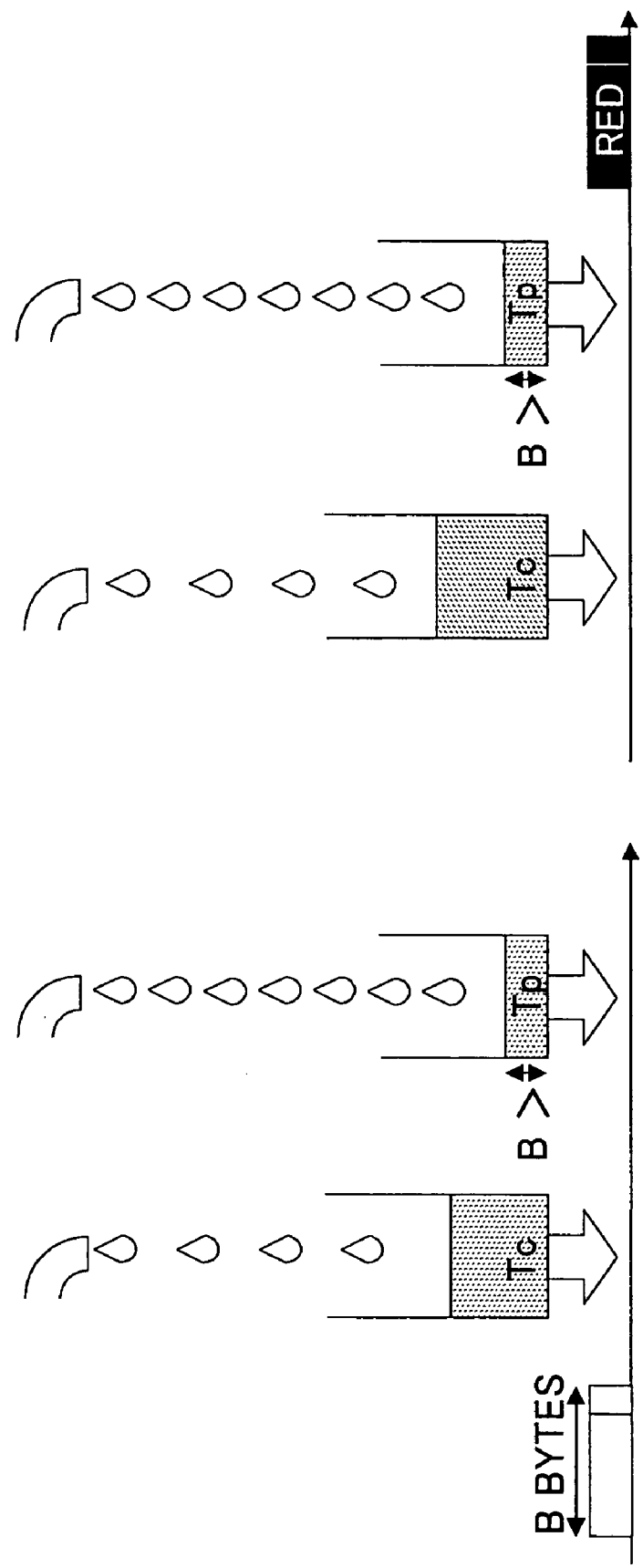
FIG. 2 is a diagram for explaining an operation of a policer.
Figure 3:
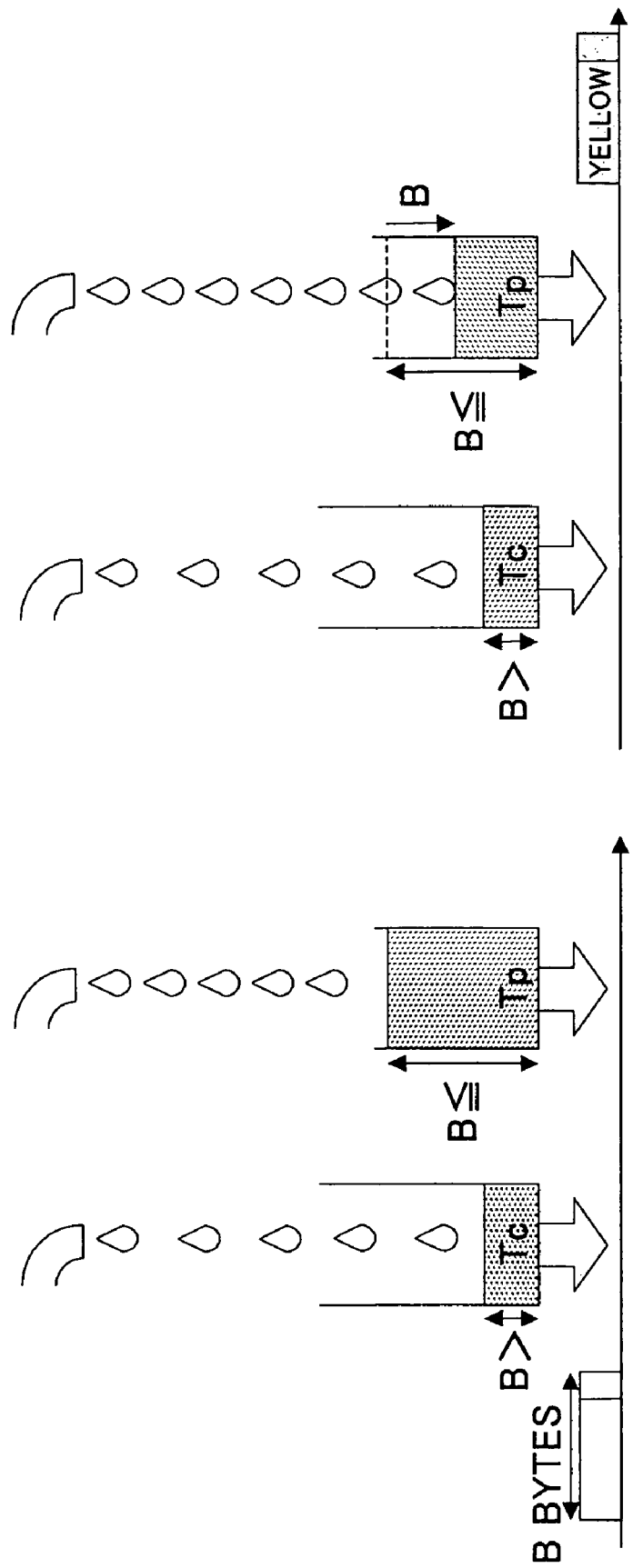
FIG. 3 is a diagram for explaining the operation of the policer.
Figure 4:
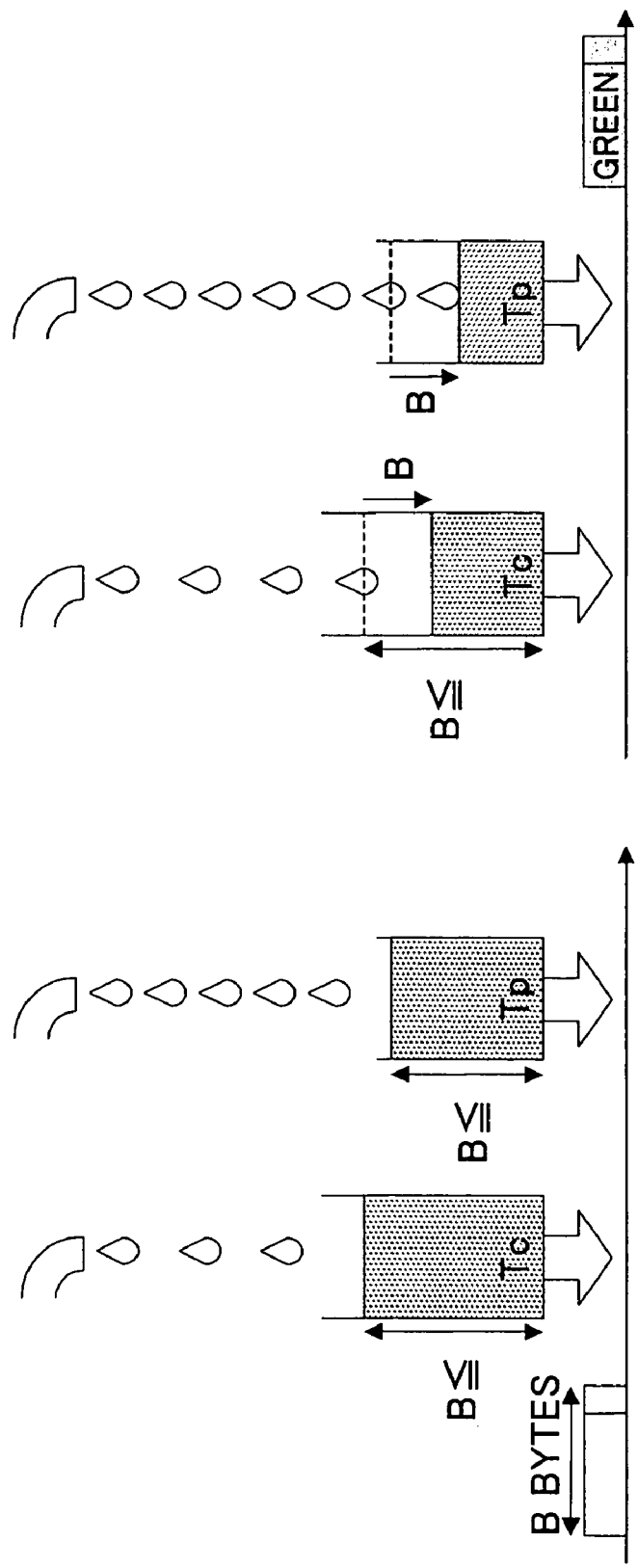
FIG. 4 is a diagram for explaining the operation of the policer.
Figure 5:
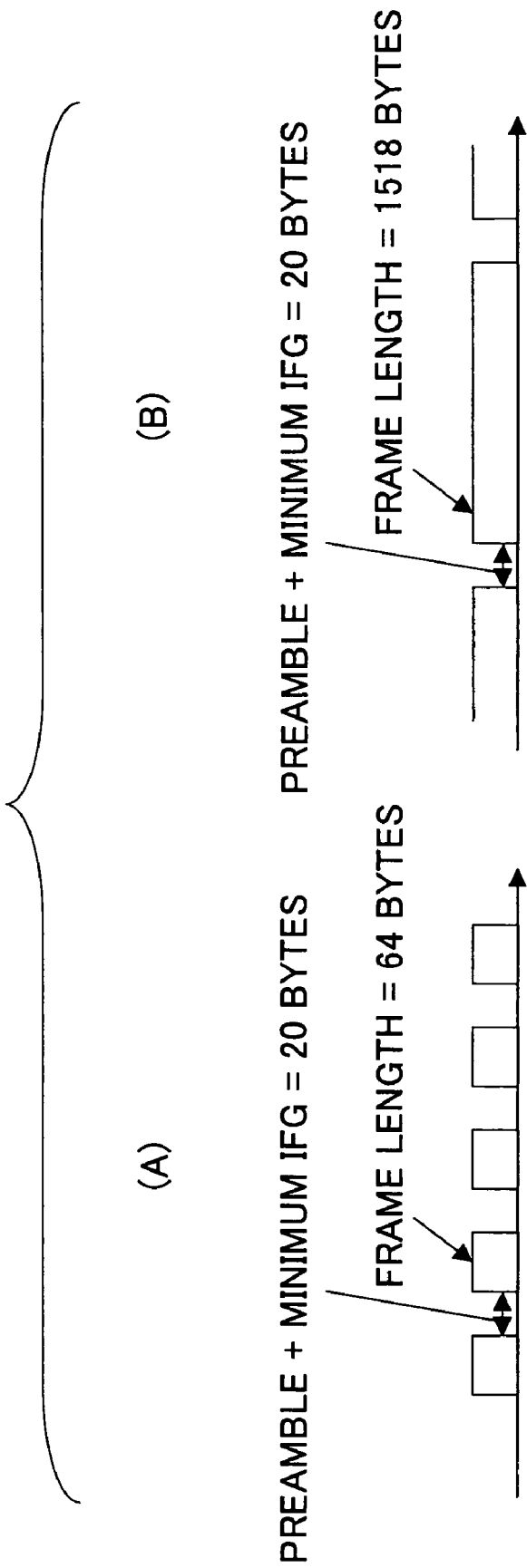
FIG. 5 is a diagram for explaining a fluctuation of a frame rate due to a frame length.
Figure 6:
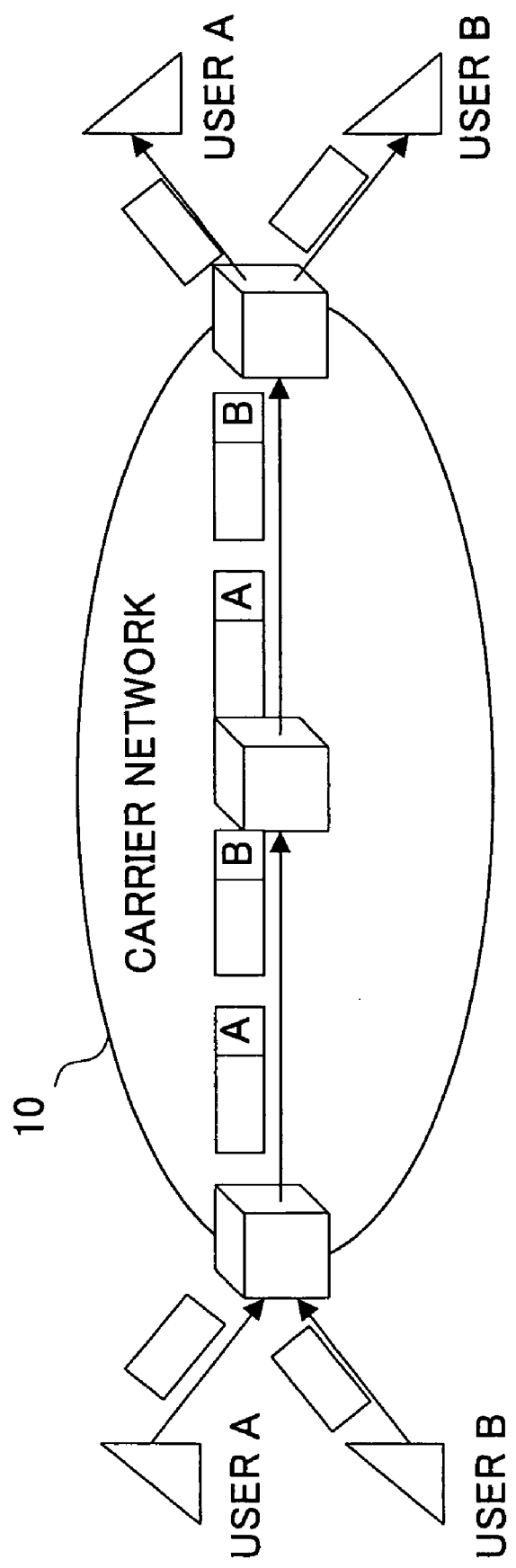
FIG. 6 is a diagram for explaining an addition of a user identification tag in a network.
Figure 7:
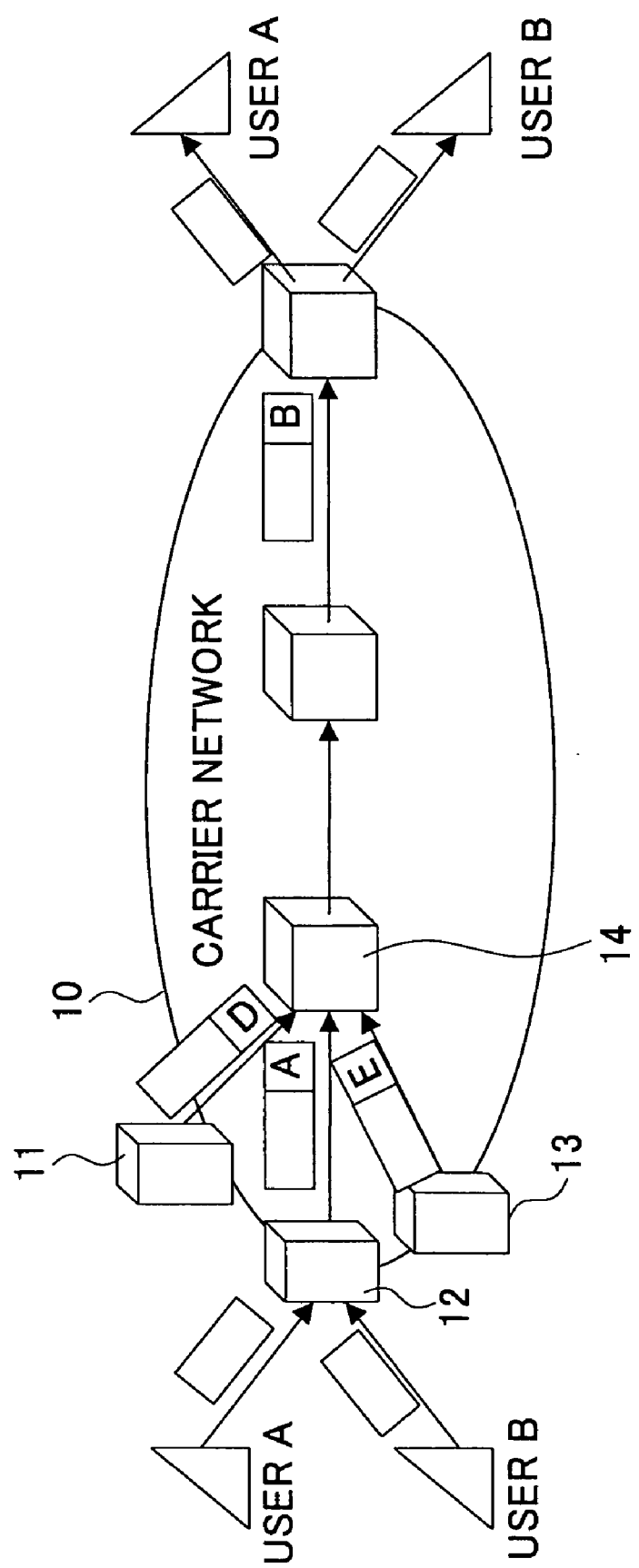
FIG. 7 is a diagram for explaining the addition of the user identification in the network.
Figure 8:
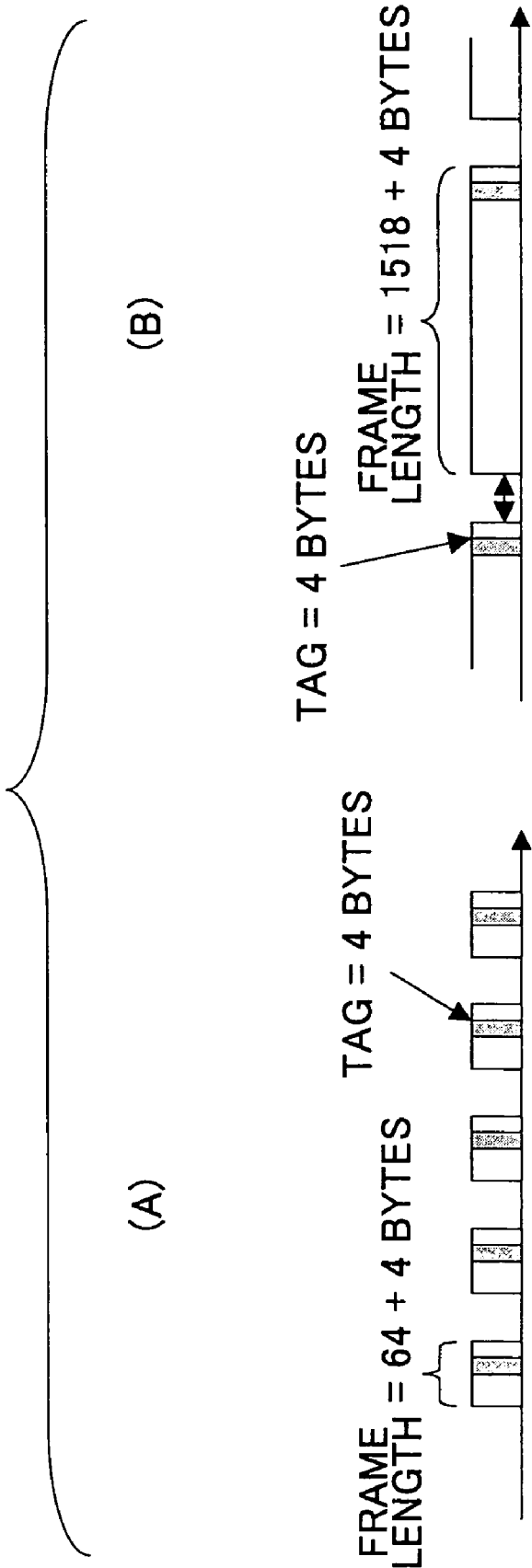
FIG. 8 is a diagram for explaining a fluctuation of a bandwidth due to the frame length.
Figure 9:
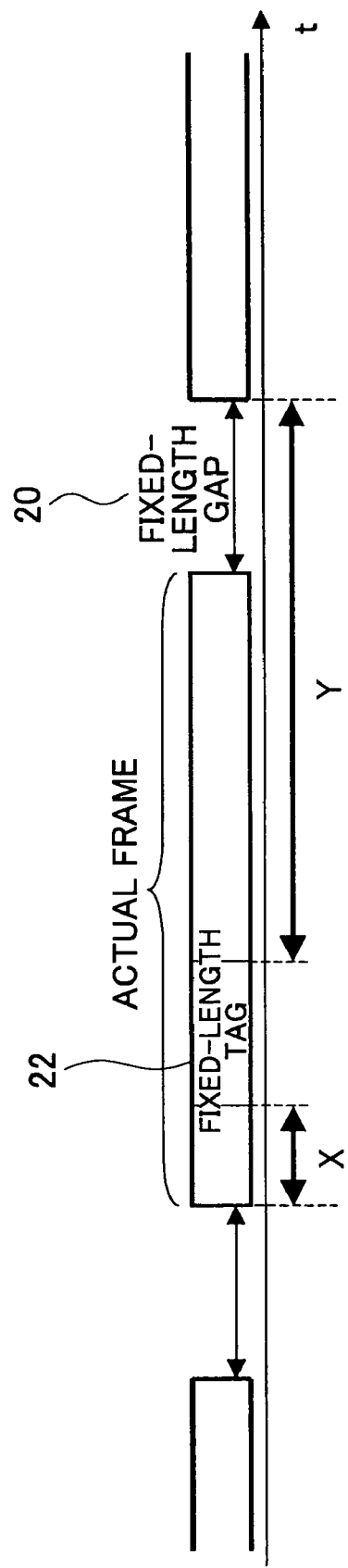
FIG. 9 is a diagram for explaining a principle of the present invention.

In the present invention, as shown in FIG. 9, a fixed-length gap 20 corresponding to a frame by one to one is defined to be a subject of a policing and a shaping even if the fixed-length gap 20 is outside a range of an actual frame, a fixed-length tag 22 corresponding to the frame by one to one is defined not to be the subject of the policing and the shaping even if the fixed-length tag 22 is inside the range of the actual frame, and regions X and Y are defined as subject regions of a flow control.

Figure 10:
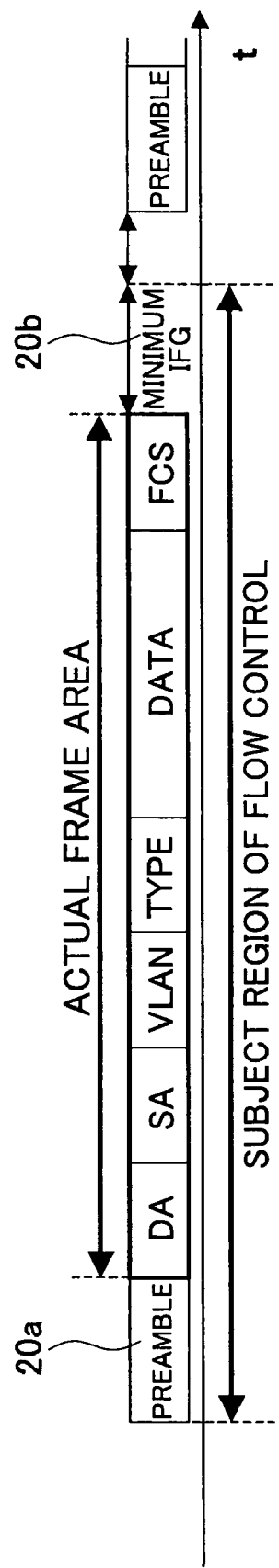
FIG. 10 is a diagram for explaining a subject of the flow control outside a frame region.

That is, portions outside a frame region such as a preamble 20a and a minimum IFG 20b shown in FIG. 10 are recognized as a part of the frame, and are defined as the subject of the flow control. In other words, when the preamble 20a showing a start of the frame is started to be received, the policer (or shaper) starts to count, and does not end counting until passing for 12 bytes of the minimum IFG even after an FCS indicating an end field of the frame.

Figure 11:
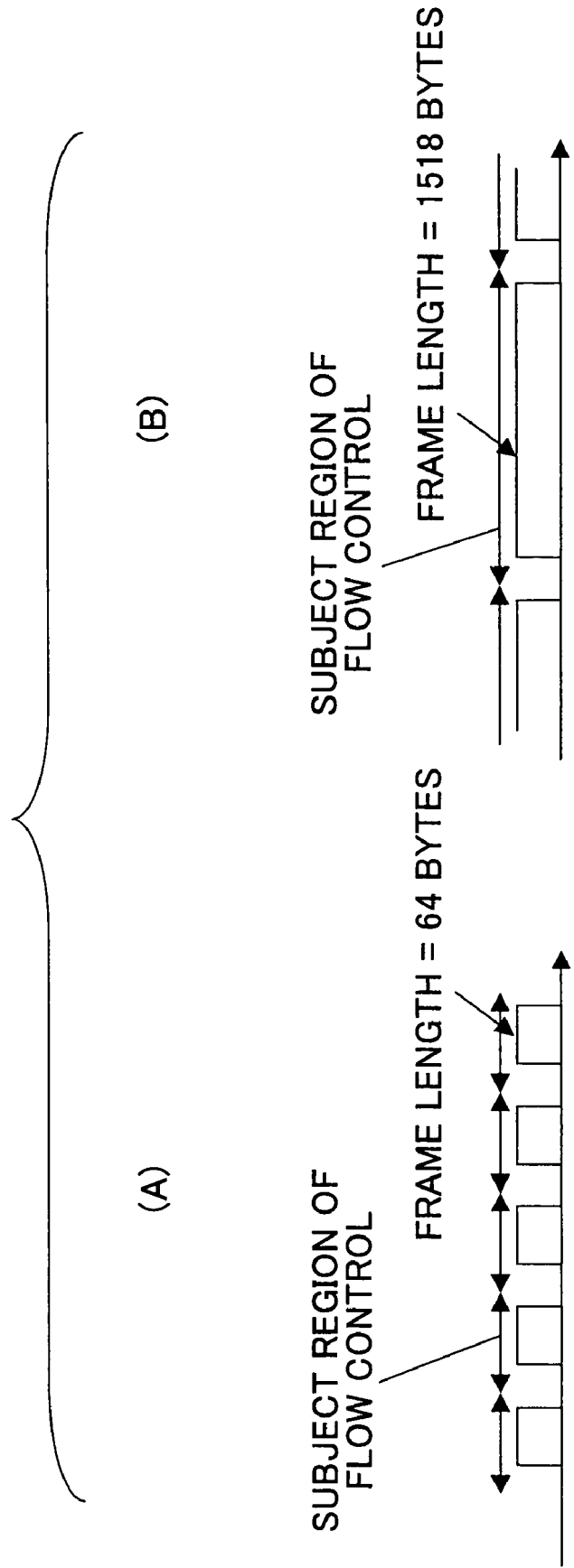
FIG. 11 is a diagram for explaining a method according to the present invention.

As described above, by defining the subject of the flow control until an area outside the frame region, as shown in FIG. 11(A) and FIG. 11(B), in any case in that the frame length is the shortest 64 bytes or the longest 1518 bytes, the same frame rate 10 Mb/s is possible to be set. Therefore, it is possible to precisely conduct the flow control.

Figure 12:
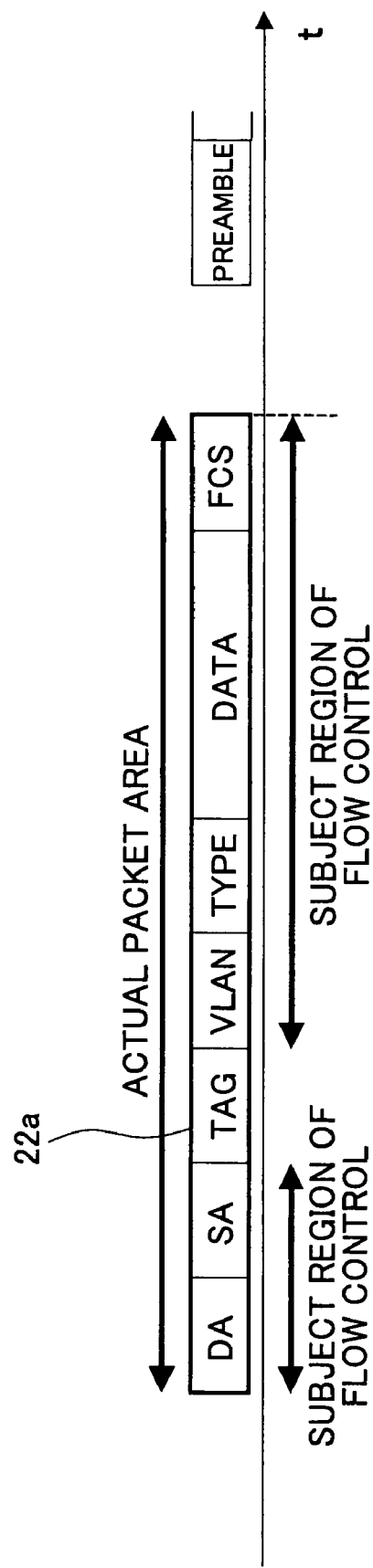
FIG. 12 is a diagram for explaining the subject of the flow control inside the frame region.

In addition, on the contrary, as shown in FIG. 12, information such as a user identification 22a additionally provided in the network is eliminated from the subject of the flow control. That is, although a count of the policer (or shaper) is started from a beginning of the frame, the count is stopped once at a portion of the user identification 22a and resumed when the user identification 22a ends.

Figure 13:
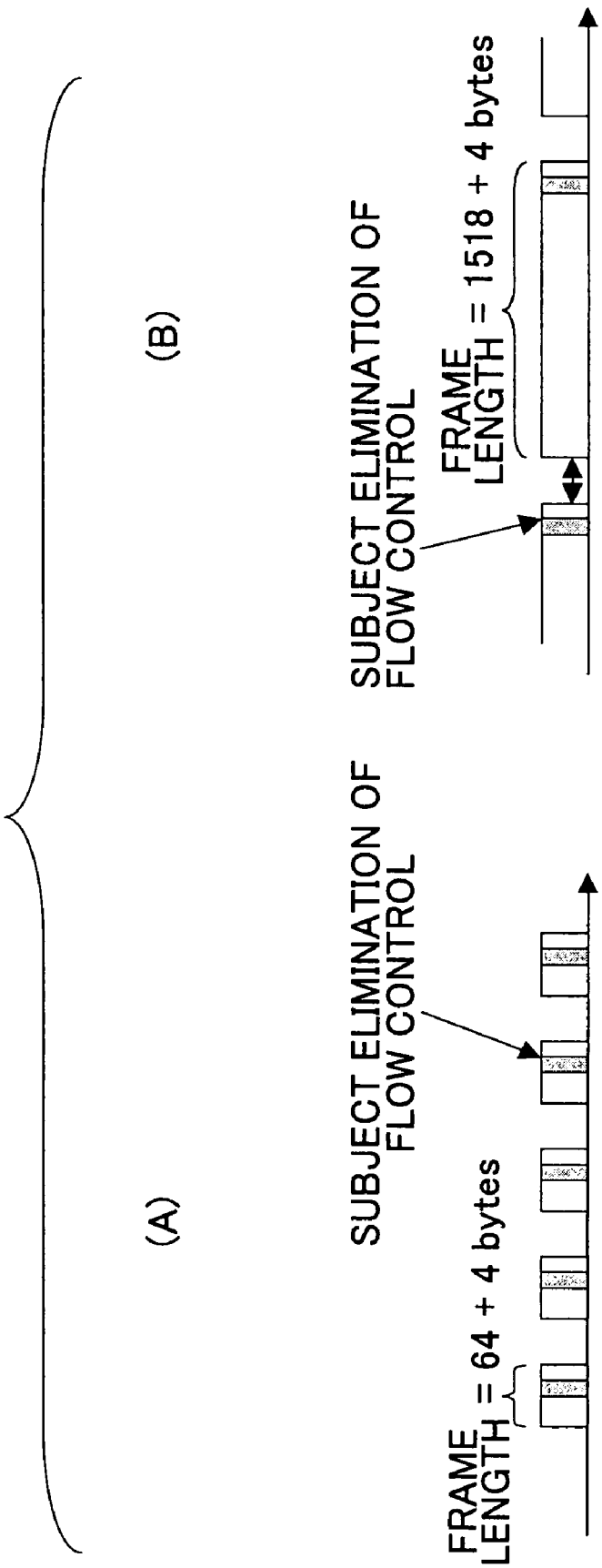
FIG. 13 is a diagram for explaining the method according to the present invention.

As described above, by defining a part of an area inside the frame region as an outside subject of the flow control, as shown in FIG. 13(A) and FIG. 13(B), even in a case in that the frame length is the shortest 64 bytes or the longest 1518 bytes, the same frame rate can be set. Therefore, it is possible to precisely conduct the flow control.

Figure 14:
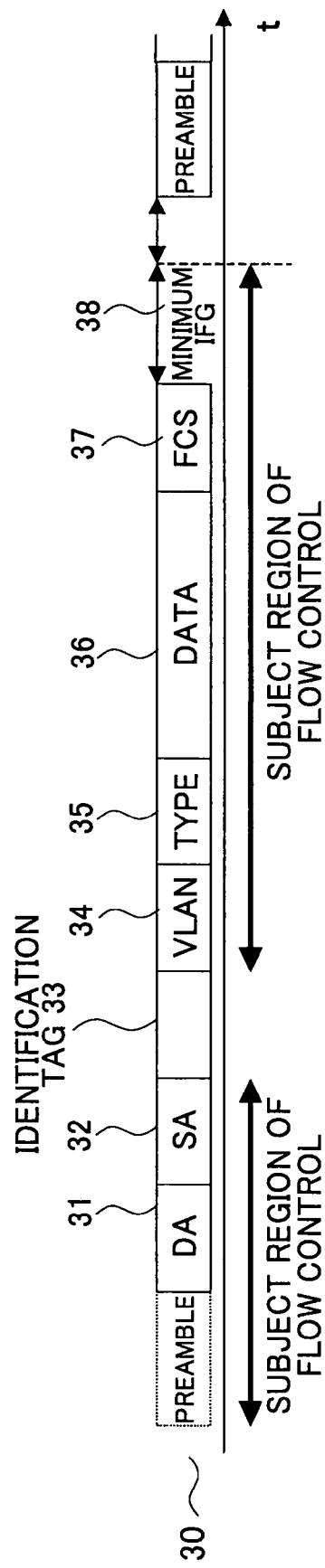
FIG. 14 is a diagram showing a LAN frame being the subject of the flow control according to the present invention.

In this point, in the embodiment, a LAN frame shown in FIG. 14 is assumed as the flow control. In FIG. 14, the LAN frame includes a preamble 30 being 8 bytes and additionally provided at the beginning of the frame, a destination address (DA) 31, a sender address (SA) 32, a user identification tag 33 being 4 bytes (first 2 bytes are predetermined values), a VLAN (Virtual Local Area Network: virtual LAN) tag 34, a type 35, data (user data) 36, and an FCS 37, and includes a minimum IFG 38 being 12 bytes after the FCS 37.

In this embodiment, the preamble 30 (8 bytes) and the minimum IFG 38 (12 bytes) are defined as the subject of the flow control of the policer or the shaper, and the user identification tag 33 (4 bytes) is defined as out of the subject of the flow control.

Figure 15:
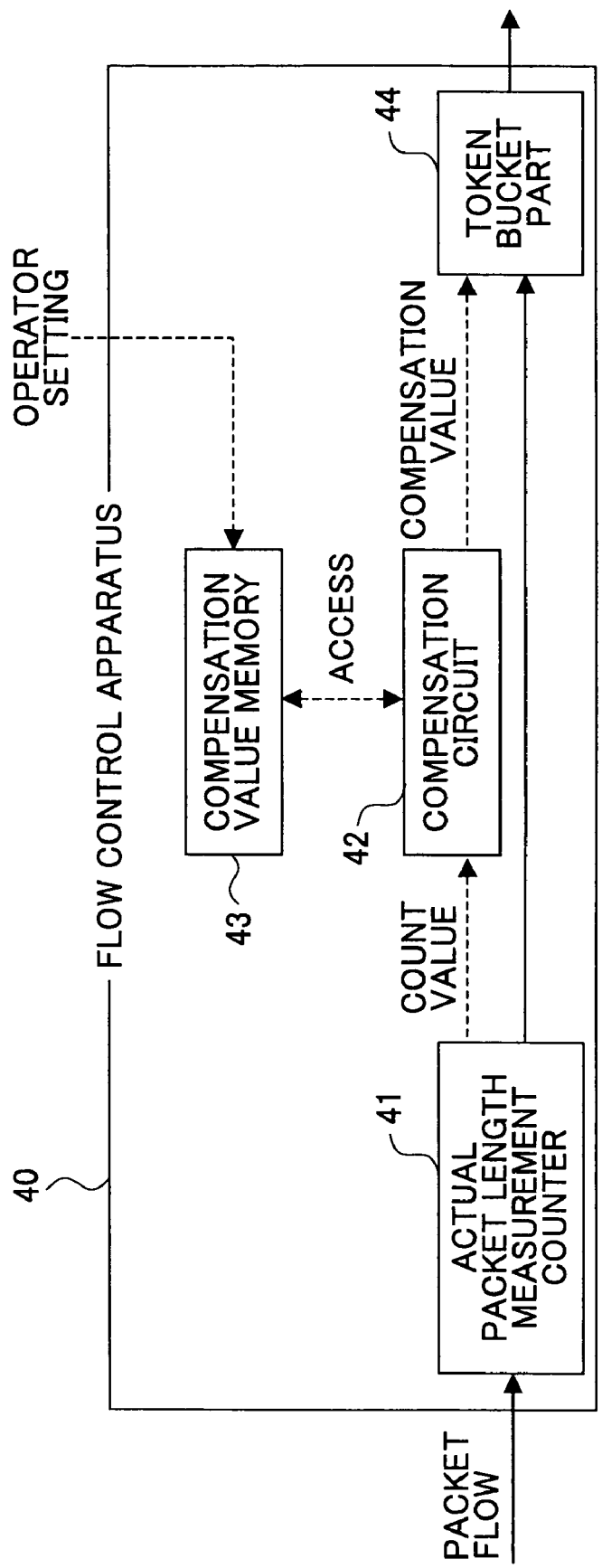
FIG. 15 is a diagram showing a first configuration of a flow control apparatus according to the present invention.

FIG. 15 is a diagram showing a first configuration of a flow control apparatus according to the present invention. In FIG. 15, a flow control apparatus 40 includes an actual packet length measurement counter 41, a compensation circuit 42, a compensation value memory 43, and a token bucket part 44.

An operator determines the policing in order to conduct the flow control, and sets a compensation value based on the policing being determined into the compensation value memory 43. In this first configuration, 20 bytes are added from outside the frame range for one frame, and 4 bytes are eliminated from inside the frame range. As a result, 16 bytes as a difference between both are added. Therefore, as the operator sets, 16 bytes are added to a value in the compensation value memory 43.

An arriving frame is supplied to the actual packet length measurement counter 41. The actual packet length measurement counter 41 counts from the beginning of the destination address 31 being a start point of a frame body to the rearmost of the FCS 37 being an end point. A count value obtained as described above is supplied to the compensation circuit 42, the 16 bytes set by the operator are added to the count value, and the count value after this compensation is passed to the token bucket part 44 as a frame length.

The frame is supplied to the token bucket part 44 through the actual packet length measurement counter 41, and also, the frame length is supplied to the token bucket part 44 through the compensation circuit 42. Then, a coloring described with reference to FIG. 1 through FIG. 4 is conducted, and the flow control is carried out.

Figure 16:
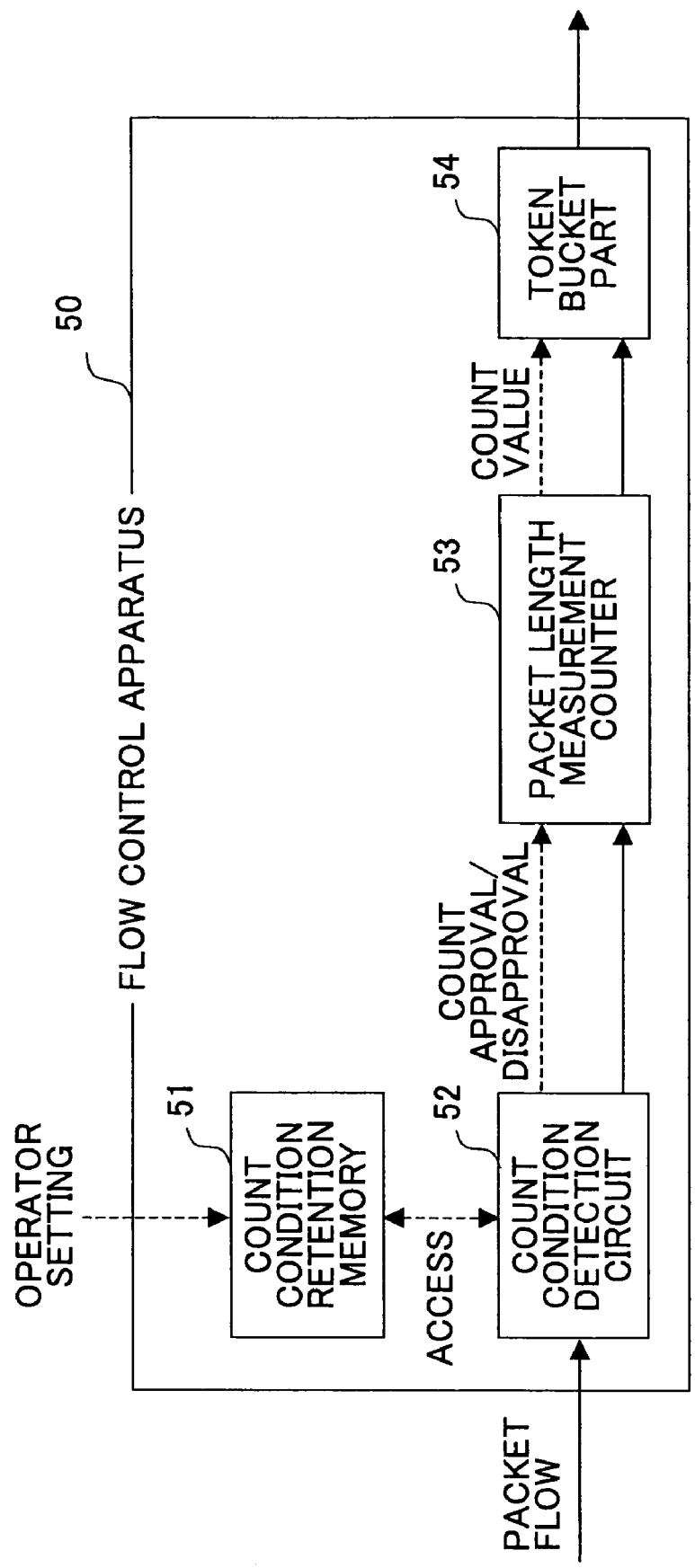
FIG. 16 is a diagram showing a second configuration of the flow control apparatus according to the present invention.

FIG. 16 is a diagram showing a second configuration of the flow control apparatus according to the present invention. In FIG. 16, a flow control apparatus 50 includes a count condition retention memory 51, a count condition detection part 52, a packet length measurement counter 53, and a token bucket part 54.

Each condition of a count start, a count temporary stop, and a count end is set to the count condition retention memory 51. In this second configuration, the condition of the count start is a start point of the preamble 30, the condition of a temporary stop is 4 bytes following to the user identification tag 33, and the condition of the count end is 12 bytes from the rearmost of the FCS 37.

Figure 17:
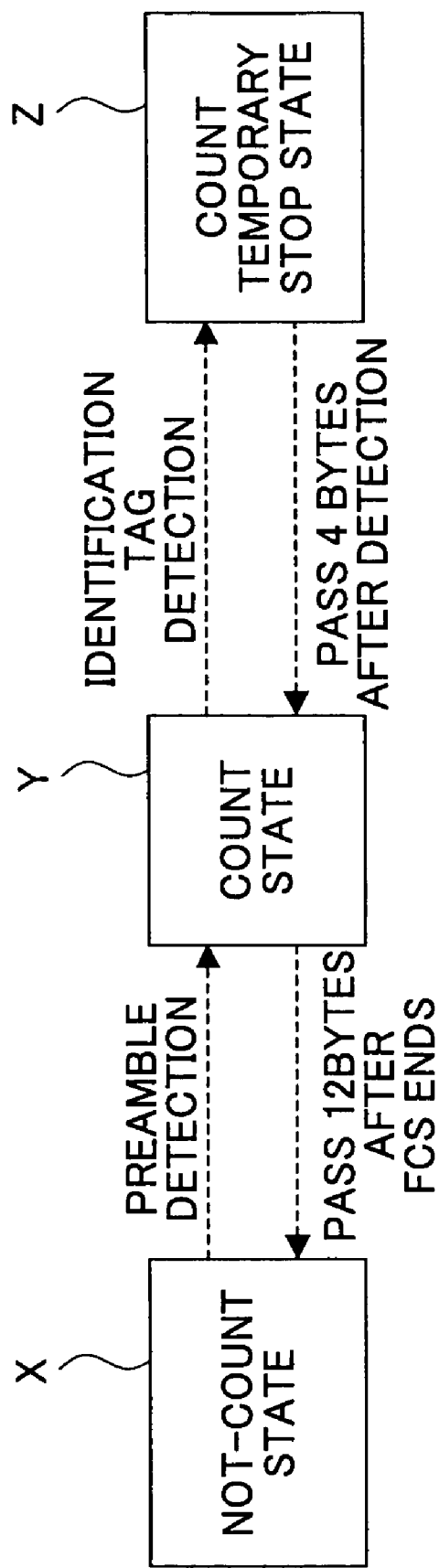
FIG. 17 is a diagram showing a state transition of a count condition detection part.

In the count condition detection part 52, a state transition diagram is formed as shown in FIG. 17. When a frame actually arrives in a not-count state X, the count condition detection part 52 transits to a count state Y at a point when the count condition detection part 52 detects a start point of the preamble 30 of the frame in accordance with the condition supplied from the count condition retention memory 51, and the count condition detection part 52 instructs a count approval to the packet length measurement counter 53. By this instruction, the packet length measurement counter 53 counts the number of bytes of the frame supplied through the count condition detection part 52.

Next, when the count condition detection part 52 detects the user identification tag 33 (first two bytes are predetermined values) of the frame, the count condition detection part 52 transits to a count temporary stop state Z while 4 bytes. For these four bytes, the count condition detection part 52 instructs a count disapproval to the packet length measurement counter 53.

After that, the count condition detection part 52 transits to the count state Y until 12 bytes after the FCS ends, and instructs the count approval to the packet length measurement counter 53. By this instruction, the packet length measurement counter 53 continues counting from the VLAN tag 34 of the frame until 12 bytes after the FCS ends.

The count value of the packet measurement counter 53 obtained as described above is passed to the token bucket part 54 as the frame length. The frame and the frame length are supplied to the token bucket part 54 through the packet length measurement counter 53, and the token bucket part 54 conducts the coloring described with reference to FIG. 1 through FIG. 4 and carries out the flow control.

In this embodiment, even in a case in that frames that have the user identification tag 33 and frames that do not have the user identification tag 33 are mixed in a frame stream transmitted in the network, the flow control can be precisely conducted.

The actual packet length measurement counter 41 and the packet measurement counter 53 correspond to a frame length measurement part in claims, the compensation circuit 42 and the compensation value memory 43 correspond to a frame length compensation part, the token bucket parts 44 and 45 correspond to a token bucket part, and the count condition retention memory 51 and the count condition detection part 52 correspond to a measurement instruction part.

As described above, according to the present invention described in claims 1 and 3, it is possible to conduct the flow control precisely and easily, independent of the frame length in a variable-length frame network, and it is possible to increase the flexibility of the location where the flow control is conducted.

Moreover, according to the present invention described in claims 2 and 4, it is possible to conduct the flow condition precisely and easily, independent of the frame length in the variable-length frame network, and it is possible to increase the flexibility of the location where the flow control is conducted.

Further, the present invention is not limited to these embodiments, but various variations and modifications may be made without departing from the scope of the present invention.

What is claimed is

1. A flow control apparatus for conducting a flow control in a network in that a variable-length frame is transmitted and a minimum inter frame gap being a fixed length is regulated among frames, said flow control apparatus comprising:
   a measurement instruction part instructing a measurement start at an beginning of a preamble outside a frame region, and instructing a measurement stop at a rearmost of an inter frame gap outside the frame region;
   a frame length measurement part measuring a frame length of each variable-length frame in accordance with an instruction of the measurement instruction part, the frame length including a portion outside the frame region; and
   a token bucket part conducting a marking of the each variable-length frame based on the frame length measured by the frame length measurement part,
   wherein the measurement instruction part instructs said frame length measurement part to temporarily stop measuring the frame length at a portion of network additional information inside the frame region.

2. The flow control apparatus as claimed in claim 1, wherein the measurement instruction part sets a measurement start location and a measurement stop location beforehand, respectively.

3. A policing apparatus for a use with a flow control apparatus as claimed in claim 1, wherein said policing apparatus conducts a policing for a variable-length frame input into a network by using the flow control apparatus.

4. A shaping apparatus for a use with a flow control apparatus as claimed in claim 1, wherein said shaping apparatus conducts a shaping for a variable-length frame output from a network by using the flow control apparatus.

* * * * *